United States Patent
Hsieh et al.

(10) Patent No.: US 9,074,887 B2
(45) Date of Patent: Jul. 7, 2015

(54) METHOD AND DEVICE FOR DETECTING DISTANCE, IDENTIFYING POSITIONS OF TARGETS, AND IDENTIFYING CURRENT POSITION IN SMART PORTABLE DEVICE

(75) Inventors: Sheng-Ta Hsieh, Taipei Hsien (TW); Shao-Fong Chen, Taipei Hsien (TW)

(73) Assignee: Wistron Corporation, Hsichih, New Taipei (TW)

( * ) Notice: Subject to any disclaimer, the term of this patent is extended or adjusted under 35 U.S.C. 154(b) by 746 days.

(21) Appl. No.: 12/764,113

(22) Filed: Apr. 21, 2010

(65) Prior Publication Data

US 2010/0310125 A1 Dec. 9, 2010

(30) Foreign Application Priority Data

Jun. 8, 2009 (TW) ................................ 98119037 A

(51) Int. Cl.
*G06K 9/00* (2006.01)
*G01C 11/04* (2006.01)
*G06T 7/00* (2006.01)

(52) U.S. Cl.
CPC .............. *G01C 11/04* (2013.01); *G06T 7/0042* (2013.01); *G06T 2207/10004* (2013.01)

(58) Field of Classification Search
None
See application file for complete search history.

(56) References Cited

U.S. PATENT DOCUMENTS

| | | | |
|---|---|---|---|
| 2,999,415 A | 9/1961 | Malinowski | |
| 4,476,494 A * | 10/1984 | Tugaye | 348/208.6 |
| 4,531,052 A * | 7/1985 | Moore | 235/404 |
| 4,787,739 A * | 11/1988 | Gregory | 356/4.03 |
| 4,949,089 A | 8/1990 | Ruszkowski | |
| 5,020,902 A * | 6/1991 | Kits van Heyningen et al. | 356/21 |
| 5,026,158 A | 6/1991 | Golubic | |
| 5,111,513 A * | 5/1992 | Turner et al. | 382/100 |
| 5,375,072 A * | 12/1994 | Cohen | 702/94 |
| 5,446,804 A * | 8/1995 | Allebach et al. | 382/298 |
| 5,616,903 A * | 4/1997 | Springer | 235/414 |
| 5,960,576 A * | 10/1999 | Robinson | 42/90 |
| 6,282,362 B1 | 8/2001 | Murphy | |
| 6,288,774 B1 | 9/2001 | Takubo | |
| 6,516,699 B2 | 2/2003 | Sammut | |
| 6,729,062 B2 * | 5/2004 | Thomas et al. | 42/122 |
| 6,963,657 B1 | 11/2005 | Nishigaki | |
| 7,292,262 B2 * | 11/2007 | Towery et al. | 348/61 |
| 7,348,564 B2 * | 3/2008 | Wollenweber et al. | 250/363.04 |
| 7,925,434 B2 | 4/2011 | Kato | |

(Continued)

FOREIGN PATENT DOCUMENTS

| | | |
|---|---|---|
| JP | 2006329967 A | 12/2006 |
| TW | 200828957 | 7/2008 |
| TW | 200907873 | 2/2009 |

OTHER PUBLICATIONS

Office action mailed on Nov. 22, 2011 for China application No. 200910148365.8, p. 3 line 5-11 and line 16-18 and line 22-25, and p. 4 line 5-8.

(Continued)

*Primary Examiner* — Avinash Yentrapati
(74) *Attorney, Agent, or Firm* — Winston Hsu; Scott Margo

(57) ABSTRACT

A method for detecting distance in a smart portable device includes acquiring an image of a target object, calculating a length of a side of the target object in the image, acquiring a predicted length of the side of the target object, and determining a distance between the smart portable device and the target object according to the length of the side of the target object in the image and the predicted length.

4 Claims, 13 Drawing Sheets

(56) References Cited

U.S. PATENT DOCUMENTS

| | | | |
|---|---|---|---|
| 8,170,284 | B2 | 5/2012 | Fujita |
| 8,230,635 | B2* | 7/2012 | Sammut et al. ............... 42/122 |
| 2003/0010190 | A1 | 1/2003 | Sammut |
| 2004/0016168 | A1* | 1/2004 | Thomas et al. ............... 42/122 |
| 2004/0101162 | A1 | 5/2004 | Higaki |
| 2005/0135668 | A1* | 6/2005 | Polichar et al. ............ 382/141 |
| 2005/0233284 | A1* | 10/2005 | Traykov et al. ............... 434/16 |
| 2006/0215881 | A1 | 9/2006 | Nakajima |
| 2006/0260171 | A1 | 11/2006 | Cole |
| 2007/0237363 | A1 | 10/2007 | Hagio |
| 2008/0010891 | A1* | 1/2008 | Cole ............................. 42/130 |
| 2008/0069404 | A1 | 3/2008 | Lee |
| 2008/0153516 | A1 | 6/2008 | Hsieh |
| 2008/0154494 | A1 | 6/2008 | Kato |
| 2009/0205239 | A1* | 8/2009 | Smith, III ..................... 42/122 |
| 2010/0310125 | A1* | 12/2010 | Hsieh et al. .................. 382/103 |
| 2011/0123068 | A1 | 5/2011 | Miksa |
| 2011/0132983 | A1 | 6/2011 | Sammut |
| 2012/0025989 | A1 | 2/2012 | Cuddihy |
| 2012/0117848 | A1* | 5/2012 | Cox et al. ..................... 42/130 |
| 2012/0118955 | A1 | 5/2012 | Cox |

OTHER PUBLICATIONS

Office action mailed on Sep. 28, 2012 for the Taiwan application No. 098119037, p. 2 line 2-11 and p. 3 line 7-21.

* cited by examiner

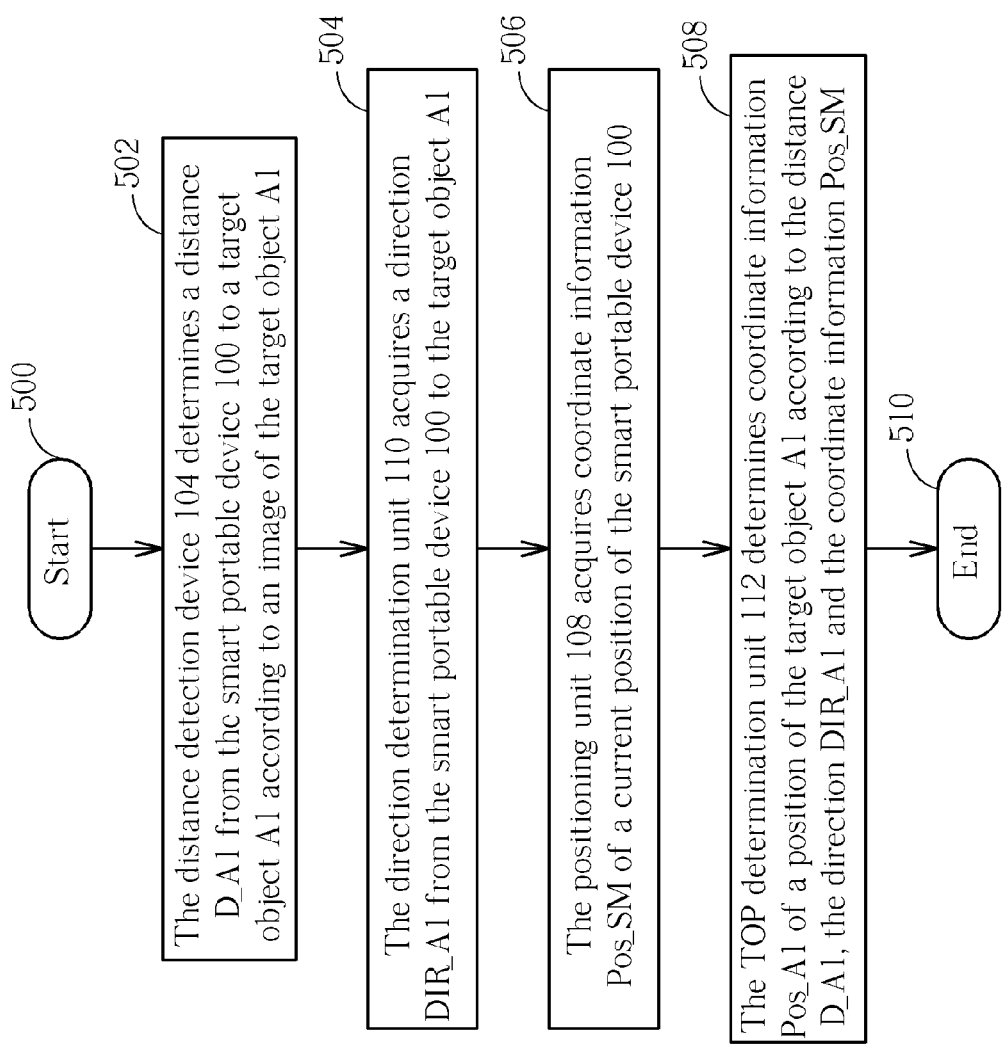

METHOD AND DEVICE FOR DETECTING DISTANCE, IDENTIFYING POSITIONS OF TARGETS, AND IDENTIFYING CURRENT POSITION IN SMART PORTABLE DEVICE

BACKGROUND OF THE INVENTION

1. Field of the Invention

The present invention is related to methods and devices for detecting distance, identifying positions of targets, and identifying a current position in a smart portable device, and more particularly, to methods and devices capable of enhancing functions of the smart portable device, so as to detect distance, identify positions of targets, and identify the current position of the smart portable device.

2. Description of the Prior Art

With the advancement of technology, a smart portable device includes various functions, such as voice communication, wireless networking, navigation, photography, video display, etc. The navigation function is performed with a global positioning system (GPS), to plan a route toward a destination set by a user according to existed map data, such that the user can reach the destination in a shorter path or with less time. To accomplish the navigation function, the smart portable device must include a GPS receiver and related navigation software.

In general, when using the smart portable device for navigating to a destination, the user has to confirm information of the destination, such as name, address, coordinate, etc., and input the information to the smart portable device, to perform route planning tasks. However, in some occasions, the user cannot acquire information of the destination, and therefore cannot use the navigation function even if the GPS receiver and related software operate regularly. For example, when the user discovers an unknown spot or object (e.g. building, mountain, temple, etc.) and desires to visit, the user cannot perform navigation via the smart portable device since no specific information of the spot can be gathered. Besides, if the GPS receiver is not embedded in the smart portable device or malfunctions due to breakdown, bad weather, or being shielded, a current position of the user cannot be identified, such that the user cannot be navigated to a spot even if the user recognizes the name or address of the spot.

Therefore, how to enhance the navigation function of the smart portable device has been one of the major targets of the industry.

SUMMARY OF THE INVENTION

It is therefore a primary objective of the claimed invention to provide methods and devices for detecting distance, identifying positions of targets, and identifying a current position in a smart portable device.

The present invention discloses a method for detecting distance in a smart portable device. The method comprises acquiring an image of a target object, calculating a length of a side of the target object in the image, acquiring a predicted length of the side of the target object, and determining a distance between the smart portable device and the target object according to the length of the side of the target object in the image and the predicted length.

The present invention further discloses a device for detecting distance in a smart portable device. The device comprises an image acquisition unit for acquiring an image of a target object, a measurement unit for calculating a length of a side of the target object in the image, an estimation unit for acquiring a predicted length of the side of the target object, and a logic unit for determining a distance between the smart portable device and the target object according to the length of the side of the target object in the image and the predicted length.

The present invention further discloses a method for recognizing a position of a target object in a smart portable device. The method comprises determining a distance between the smart portable device and the target object according to an image of the target object, acquiring a direction from the smart portable device to the target object, acquiring coordinate information of a current position of the smart portable device, and determining the position of the target object according to the distance between the smart portable device and the target object, the direction from the smart portable device to the target object and the coordinate information of the current position of the smart portable device.

The present invention further discloses an electronic device for recognizing a position of a target object in a smart portable device. The electronic device comprises a distance detection device for determining a distance between the smart portable device and the target object according to an image of the target object, a direction determination unit for acquiring a direction from the smart portable device to the target object, a positioning unit for acquiring coordinate information of a current position of the smart portable device, and a determination unit for determining the position of the target object according to the distance between the smart portable device and the target object, the direction from the smart portable device to the target object and the coordinate information of the current position of the smart portable device.

The present invention further discloses a method for recognizing a current position of a smart portable device. The method comprises determining distances between the smart portable device and a plurality of target objects according to a plurality of images of the plurality of target objects, acquiring a plurality of coordinate information corresponding to positions of the plurality of target objects, and determining the current position of the smart portable device according to the distances between the smart portable device and the plurality of target objects and the plurality of coordinate information.

The present invention further discloses an electronic device for recognizing a current position of a smart portable device. The electronic device comprises a distance detection device for determining distances between the smart portable device and a plurality of target objects according to a plurality of images of the plurality of target objects, a coordinate determination unit for acquiring a plurality of coordinate information corresponding to positions of the plurality of target objects, and a determination unit for determining the current position of the smart portable device according to the distances between the smart portable device and the plurality of target objects and the plurality of coordinate information.

The present invention further discloses a method for recognizing a current position of a smart portable device. The method comprises determining a distance between the smart portable device and a target object according to an image of the target object, acquiring coordinate information of the target object, acquiring a direction from the smart portable device to the target object, and determining the current position of the smart portable device according to the distance between the smart portable device and the target object, the coordinate information and the direction from the smart portable device to the target object.

The present invention further discloses an electronic device for recognizing a current position of a smart portable device. The electronic device comprises a distance detection device for determining a distance between the smart portable device and a target object according to an image of the target object, a coordinate determination unit for acquiring coordinate information of the target object, a direction determination unit for acquiring a direction from the smart portable device to the target object, and a determination unit for determining the current position of the smart portable device according to the distance between the smart portable device and the target object, the coordinate information and the direction from the smart portable device to the target object.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5A is a schematic diagram of a target object position determination process according to an embodiment of the present invention.

DETAILED DESCRIPTION

The present invention acquires an image of a target object, and determines a distance between the target object and a smart portable device based upon a mil law. When the distance between the target object and the smart portable device is determined, the present invention further utilizes a global positioning system (GPS), an electric compass (e-compass) and a gravity sensor (G-sensor) to determine a position of the target object for navigation usage. Alternatively, the present invention utilizes a geographic information system and the e-compass to determine a current position of the smart portable device, so as to verify a location of a user by navigation software. Furthermore, with the geographic information system, the present invention can utilize images of multiple target objects to determine the current position of the smart portable device.

To clearly describe spirits and applications of the present invention, the following description is divided into three parts: introduction, implementation of distance detection and applications of distance detection.

1. Introduction

Figure 1:
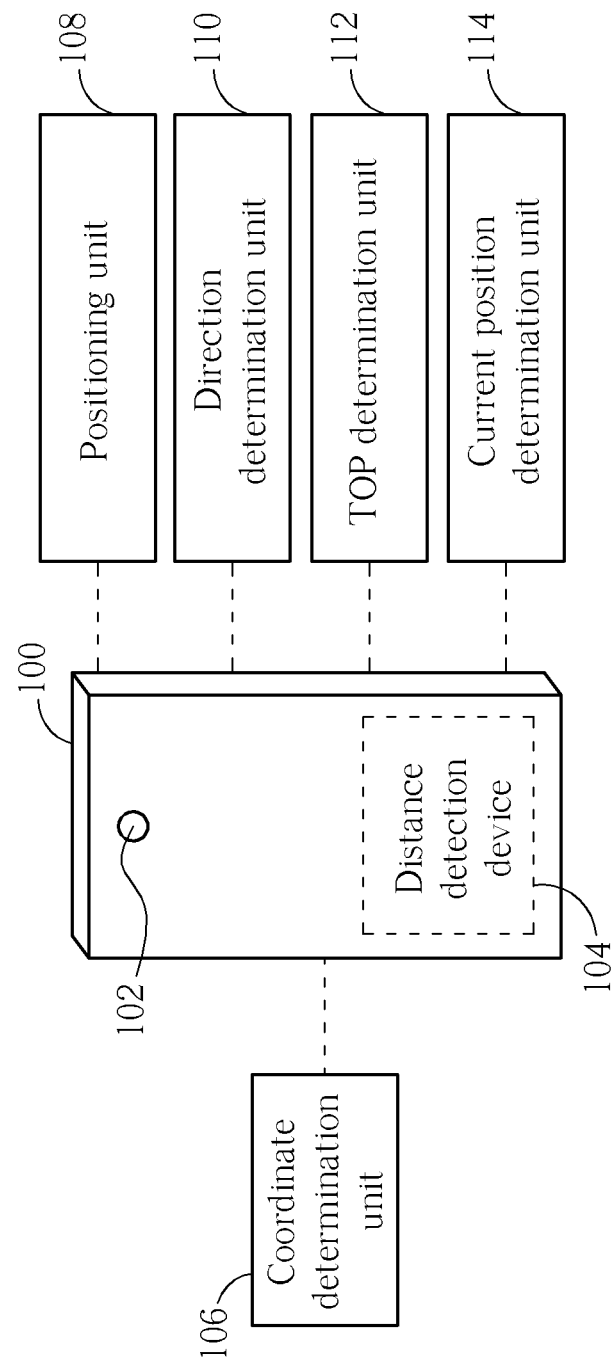
FIG. 1 is a schematic diagram of a smart portable device according to an embodiment of the present invention.

Please refer to FIG. 1, which is a schematic diagram of a smart portable device 100 according to an embodiment of the present invention. The smart portable device 100 includes a camera 102, a distance detection device 104 and other related circuits (not shown in FIG. 1). Also, the smart portable device 100 can cooperate with a coordinate determination unit 106, a positioning unit 108, a direction determination unit 110, a target object position (TOP) determination unit 112 and a current position determination unit 114, to achieve different applications. The distance detection device 104 determines a distance between a target object and the smart portable device 100 according to an image of the target object. The coordinate determination unit 106 can be software programs installed in the smart portable device 100, and is utilized for acquiring coordinate information of the target object via a geographic information system. The positioning unit 108 is a GPS receiver, and preferably, coupled to the smart portable device 100 externally. The direction determination unit 110 can be an e-compass, and is utilized for acquiring a direction from the smart portable device 100 to the target object. The TOP determination unit 112 can determine a position of the target object according to measurement results generated by the distance detection device 104, the direction determination unit 110 and the positioning unit 108. The current position determination unit 114 can determine a current position of the smart portable device 100 according to measurement results generated by the distance detection device 104 and the coordinate determination unit 106 or determine the current position of the smart portable device 100 according to the measurement results generated by the distance detection device 104, the direction determination unit 110 and the coordinate determination unit 106.

Therefore, operations of the smart portable device 100 can be classified into four cases:

(1) Using the distance detection device 104, the smart portable device 100 can determine a distance to a target object.

(2) Using the distance detection device 104, the positioning unit 108, the direction determination unit 110 and the TOP determination unit 112, the smart portable device 100 can determine position or coordinate corresponding to a target object for navigation usage.

(3) Using the distance detection device 104, the coordinate determination unit 106 and the current position determination unit 114, the smart portable device 100 can determine the current position according distances and coordinates corresponding to multiple target objects.

(4) Using the distance detection device 104, the coordinate determination unit 106, the direction determination unit 110 and the current position determination unit 114, the smart portable device 100 can determine the current position according to distance, coordinate and direction corresponding to a target object.

In short, the present invention can acquire a distance(s) between a target object(s) and the smart portable device 100 via the distance detection device 104, so as to determine the position or coordinate of the target object or the current position of the smart portable device 100. Distance detection methods employed in the present invention are described in the following.

2. Implementation of Distance Detection

Figure 2A:
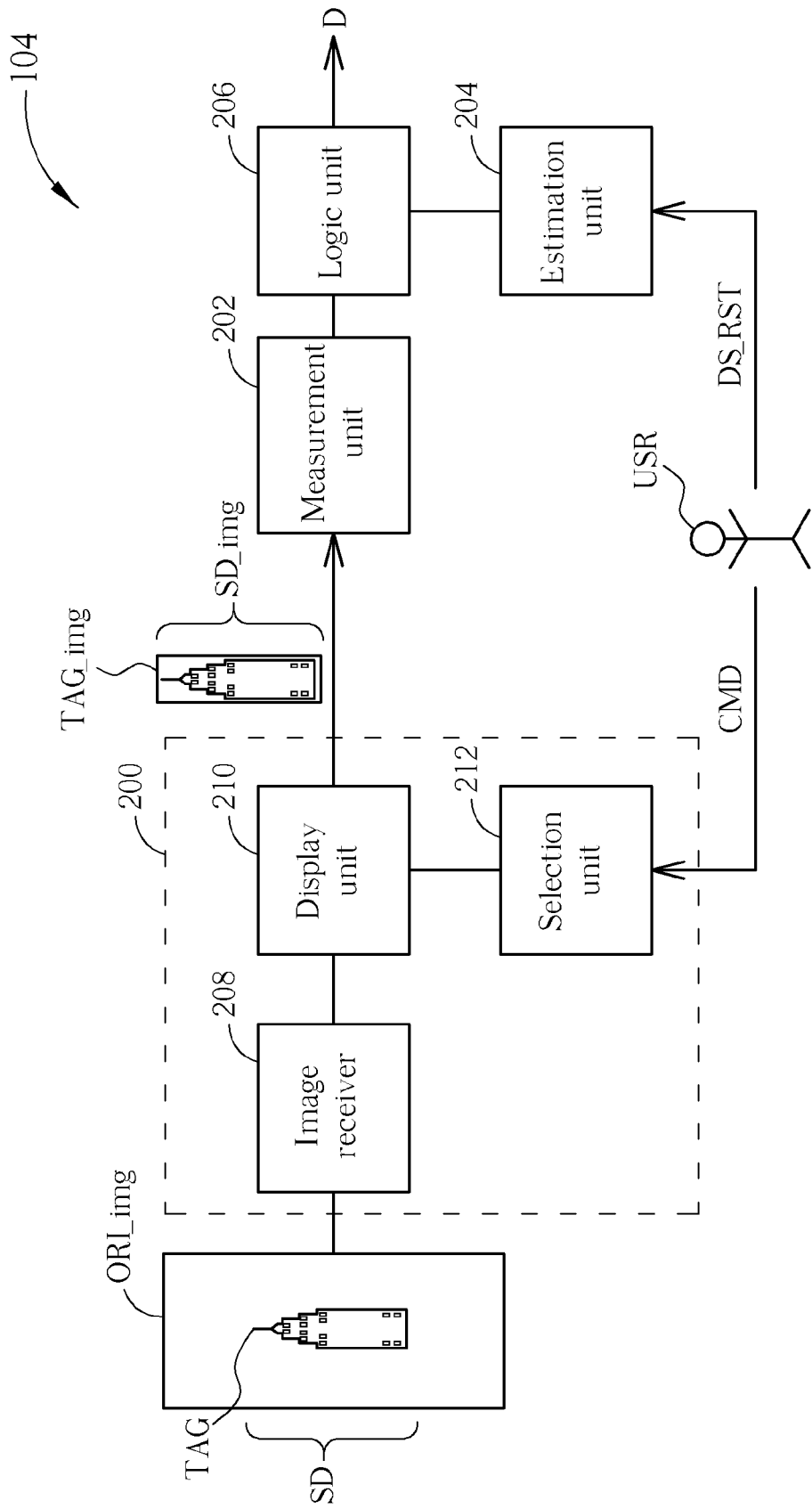
FIG. 2A is a schematic diagram of a distance detection device shown in FIG. 1.

Please refer to FIG. 2A, which is a schematic diagram of the distance detection device 104 shown in FIG. 1. The distance detection device 104 includes an image acquisition unit 200, a measurement unit 202, an estimation unit 204 and a logic unit 206. The image acquisition unit 200 is utilized for acquiring an image TAG_img of a target object TAG, and includes an image receiver 208, a display unit 210 and a selection unit 212. The image receiver 208 can be the camera 102 or the likes, and is utilized for receiving a first image ORI_img including the target object TAG. The display unit 210 can be a screen of the smart portable device 100 or the likes, and is utilized for displaying and enlarging the first image ORI_img. The selection unit 212 is utilized for selecting the target object TAG in the first image ORI_img according to a selection command CMD sent by a user USR, to acquire the image TAG_img. The measurement unit 202 is utilized for calculating a length of a side SD_img of the image TAG_img, i.e. a length of a side SD of the target object TAG in the image TAG_img. The estimation unit 204 is utilized for acquiring a predicted length of the side SD of the target object TAG according to a length prediction result DS_RST predicted by the user USR. Finally, the logic unit 206 is utilized for determining a distance D between the smart portable device 100 and the target object TAG according to the length of the side SD_img and the predicted length of the side SD.

In short, when the user USR desires to determine the distance D to the target object TAG via the distance detection device 104, the first image ORI_img including the target object TAG has to be acquired first to allow the user USR to select the image TAG_img of the target object TAG in the first image ORI_img. Meanwhile, the user USR has to predict the (real) length of the side SD of the target object TAG. Next, the present invention can determine the distance D between the smart portable device 100 and the target object TAG according to the length prediction result DS_RST of the side SD and the length corresponding to the side SD in the image TAG_img.

Figure 2B:
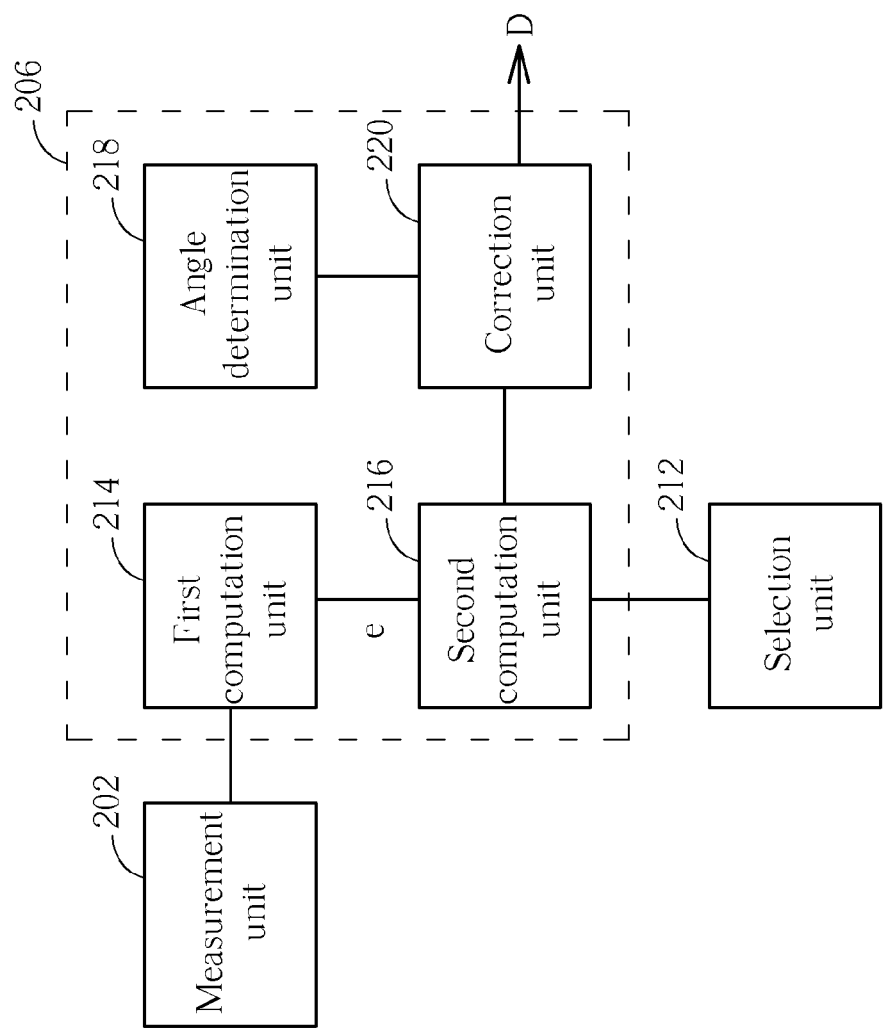
FIG. 2B is a schematic diagram of an embodiment of a logic unit shown in FIG. 2A.

Please continue to refer to FIG. 2B, which is a schematic diagram of an embodiment of the logic unit 206 shown in FIG. 2A. As illustrated in FIG. 2B, the logic unit 206 includes a first computation unit 214, a second computation unit 216, an angle determination unit 218 and a correction unit 220. The first computation unit 214 is utilized for determining a mil value "e" of the length of the side SD_img in the image TAG_img. The second computation unit 216 is utilized for calculating the distance D between the smart portable device 100 and the target object TAG according to a ratio of the predicted length of the side SD to the mil value e. In addition, the angle determination unit 218 and the correction unit 220 are utilized for enhancing precision of the second computation unit 216. The angle determination unit 218 can be a G-sensor, and is utilized for determining an angle when the image acquisition unit 200 acquires the first image ORI_img, such that the correction unit 220 can correct the distance D between the smart portable device 100 and the target object TAG according to the angle.

Figure 3A:
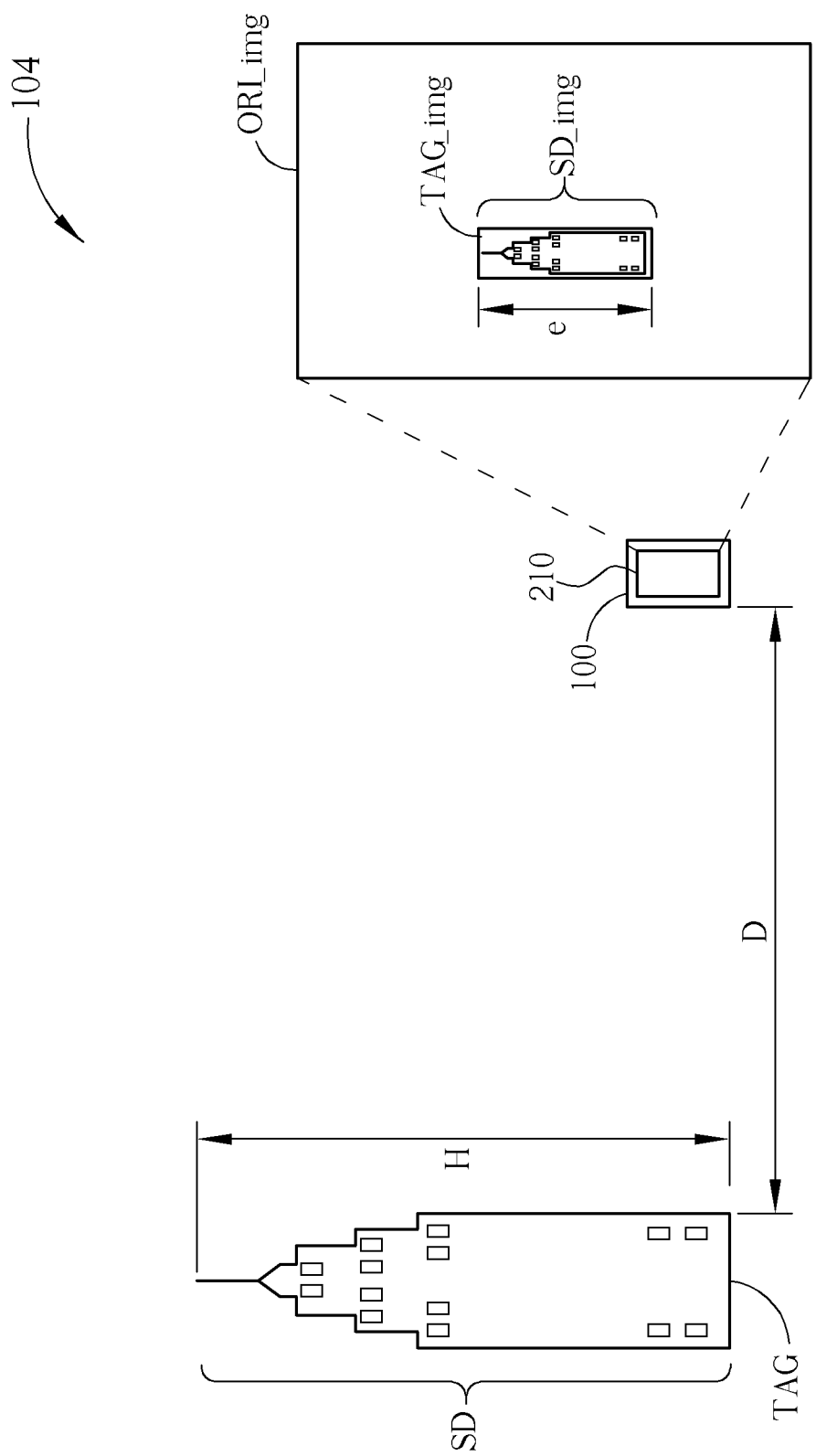
FIG. 3A is a schematic diagram of an embodiment in which the distance detection device shown in FIG. 1 determines a distance between the smart portable device and a target object.

Please refer to FIG. 3A for detail operations of the logic unit 206 shown in FIG. 2B. FIG. 3A is a schematic diagram of an embodiment in which the distance detection device 104 determines the distance D between the smart portable device 100 and the target object TAG. As illustrated in FIG. 3A, assume that the length (or height) of the side D of the target object TAG is H, and the mil value of the length of the corresponding side SD_img in the image TAG_img is e. Therefore, the distance D has:

$$D(m)=1000\times H(m)/e(mil) \qquad \text{(Eq. 1)}$$

where the length H of the side SD can be acquired according to the length prediction result DS_RST. For that reason, the distance detection device 104 can determine the distance D.

Figure 3B:
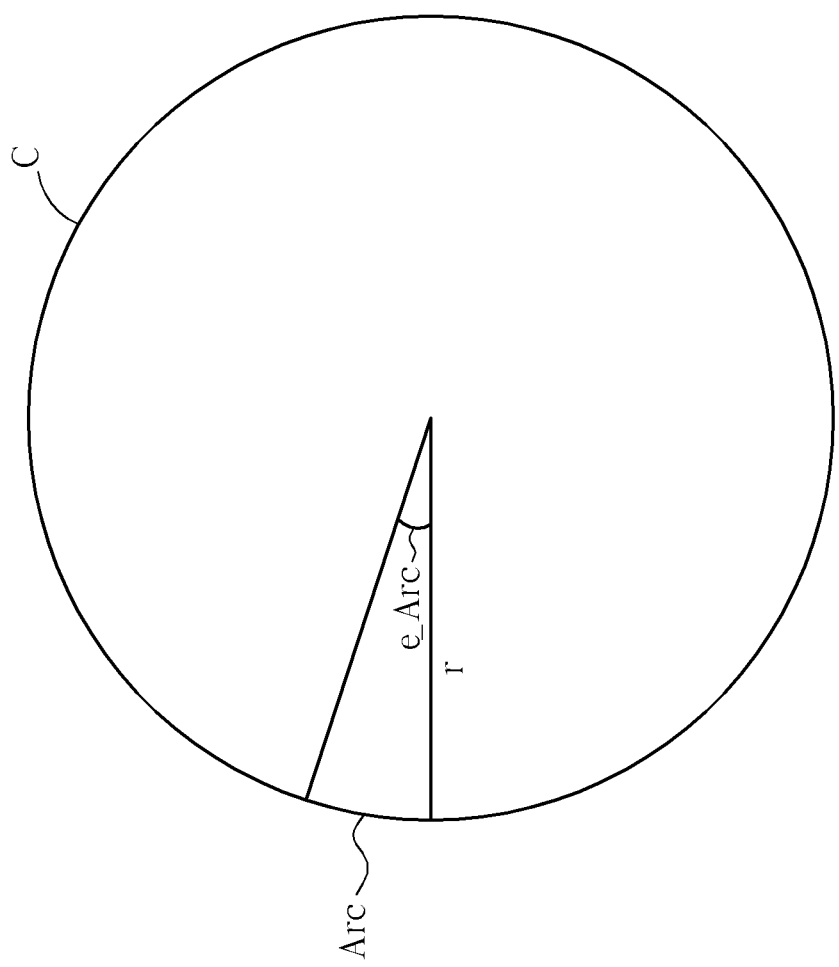
FIG. 3B is a schematic diagram illustrating the main concept of a mil law.

"mil" is a unit of angular measurement, and a circumference of a circle (360 degrees) is divided into 6400 mils. Please refer to FIG. 3B for a better understanding of a concept of the mil law. In FIG. 3B, "r" denotes a radius of a circle, "C" denotes a circumference of the circle, "Arc" denotes an arc on the circumference C, and e_Arc denotes a mil value corresponding to the arc Arc. Note that, a ratio of the arc Arc to the circumference C is equal to a ratio of the mil value e_Arc to the mil value of the circumference C (=6400), i.e.

$$\text{Arc}:C=e\_\text{Arc}:6400 \qquad \text{(Eq. 2)}$$

Besides, using a formula related to circumference and radius, the circumference C has:

$$C=2\pi r \approx 2\times 3.14\times r=6.28r \qquad \text{(Eq. 3)}$$

substitute the circumference C in Eq. 2 by Eq. 3, then:

$$\text{Arc}:6.28r=e\_\text{Arc}:6400$$

$$\text{Arc}/e\_\text{Arc}=6.28r/6400=r/1000$$

Therefore, $r \approx 1000 \times \text{Arc}/e\_\text{Arc}$.

When the distance is great enough to make the mil value e_Arc smaller than 300, a length of the arc is approximate to the height of the target object, and that is why Eq. 1 stands. Besides, 1 mil is defined as a radian of a 1-meter-high object observed at a position 1000 meters away. Therefore, as long as a 1-meter-high object is placed at a position 1000 meters away, and a measured length of the object in an image represents a 1-mil length of the image.

Note that, the height of the target object TAG is a basis for detecting the distance D in FIG. 3A. In practice, a width of the target object TAG can also be applied. In addition, since the image TAG_img is selected by the user USR, the display unit 210 can enlarge the first image ORI_img in order to enhance convenience. Operations of enlarging the first image ORI_img are well known for those skilled in the art and therefore not illustrated in FIG. 3A. Moreover, since the length H of the side SD is determined by the user USR, the estimation unit 204 can further provide a menu including various types of buildings or spots. As a result, the user USR can estimate the length of the side of the target object TAG based upon the target object's type, so as to enhance precision. For example, if the target object TAG is a building with 20 floors, the user USR can inform the estimation unit 204 that the building has 20 floors via the length prediction result DS_RST, such that the estimation unit 204 can determine that the target object TAG is about 60 meters high. In such a way, the distance to the target object TAG can be determined.

Figure 3C:
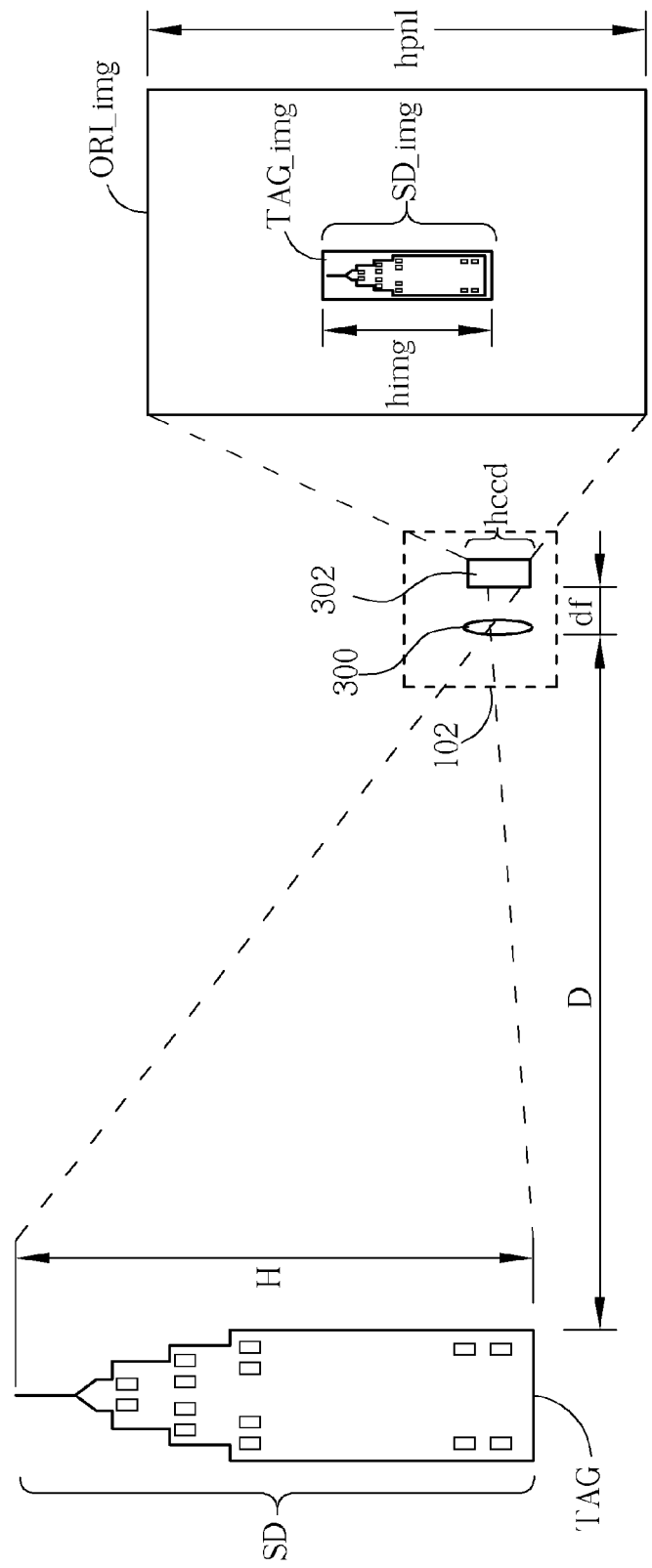
FIG. 3C is a schematic diagram of an embodiment in which the distance detection device shown in FIG. 1 determines a distance between the smart portable device and a target object.

In FIG. 3A, the mil law is utilized for determining the distance D between the smart portable device 100 and the target object TAG according to the ratio of the prediction length of the side SD to the mil value e. In practice, other similar methods can be applied in the present invention. For example, please refer to FIG. 3C, which is a schematic diagram of an alternative embodiment in which the distance detection device 104 determines the distance D between the smart portable device 100 and the target object TAG. In FIG. 3C, the camera 102 is represented by a lens 300 and a photo sensor 302 for simplicity, df denotes a distance from the lens 300 to the photo sensor 302, i.e. focal length, hccd denotes a length of a side of the photo sensors 302, hpnl denotes a length of a corresponding side of the display unit 210, and himg denotes the length of the side SD_img of the image TAG_img. If hpnl=a×hccd, i.e. the side of the display unit 210 is "a" times the length of the side of the photo sensor 302, the distance D can be determined according to the following computations:

$$H/D=hf/df$$

$$\therefore D=H/(hf/df)$$

$$\therefore D=H \times df/hf \quad \text{(Eq. A)}$$

Since hf=himg/a, Eq. A can have:

$$D=H \times df/(himg/a)$$

$$\therefore D=H \times df \cdot a/himg$$

As derived in the above, the present invention can determine the distance D from the smart portable device 100 to the target object TAG according to the length of the side SD_img in the image TAG_img and the predicted length of the side SD of the target object TAG, so as to broaden the application range.

Figure 4:
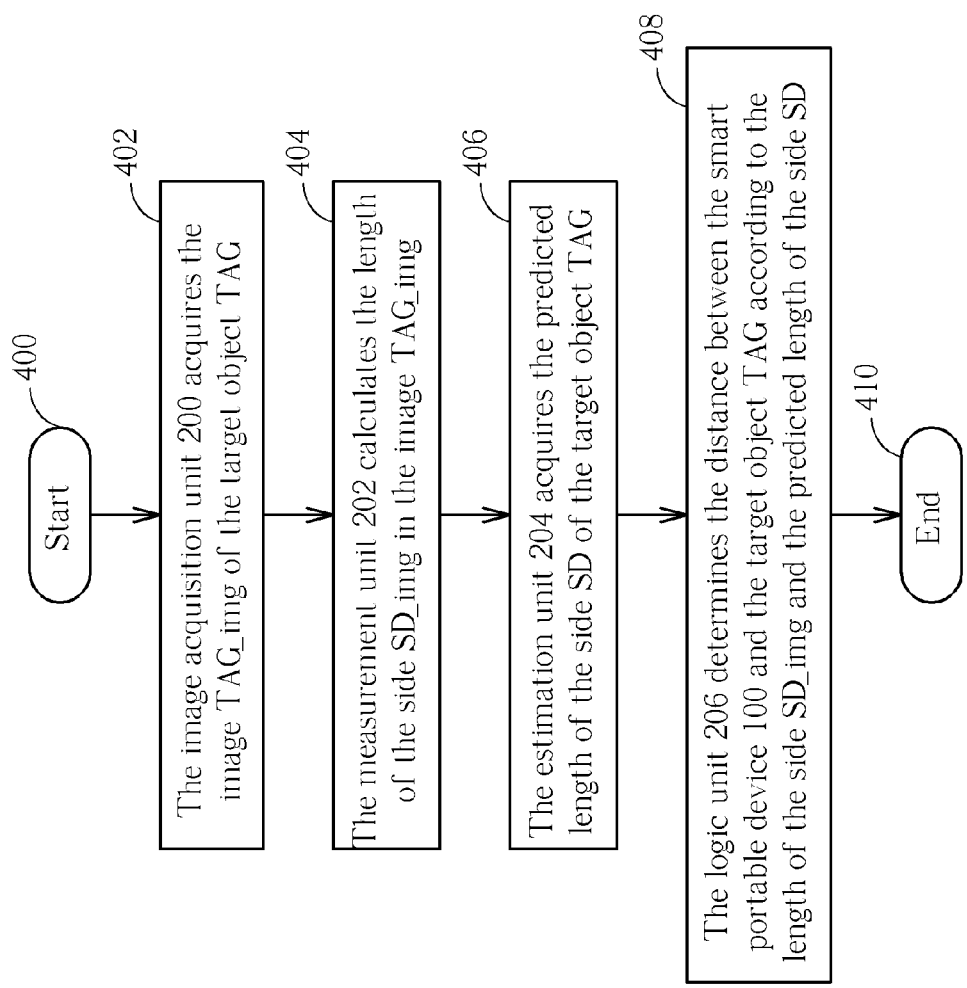
FIG. 4 is a schematic diagram of a distance detection process according to an embodiment of the present invention.

Operations of the distance detection device 104 can be summarized into a distance detection process 40, as illustrated in FIG. 4. The distance detection process 40 includes the following steps:

Step 400: Start.

Step 402: The image acquisition unit 200 acquires the image TAG_img of the target object TAG.

Step 404: The measurement unit 202 calculates the length of the side SD_img in the image TAG_img.

Step 406: The estimation unit 204 acquires the predicted length of the side SD of the target object TAG.

Step 408: The logic unit 206 determines the distance between the smart portable device 100 and the target object TAG according to the length of the side SD_img and the predicted length of the side SD.

Step 410: End.

The distance detection process 40 is utilized for summarizing the operations of the distance detection device 104. Details and variations of the distance detection process 40 can be referred in the above and are not narrated herein.

Therefore, via the distance detection device 104, the smart portable device 100 can determine the distance D to the target object TAG. After introducing the operations of the distance detection device 104, next goes to applications of distance detection.

3. Applications of Distance Detection

First: determination of the position of the target object. The smart portable device 100 can determine the position or coordinate of the target object via the distance detection device 104, the positioning unit 108, the direction determination unit 110 and the TOP determination unit 112. Operations thereof can be summarized into a TOP determination process 50, as illustrated in FIG. 5A. The TOP determination process 50 includes the following steps:

Step 500: Start.

Step 502: The distance detection device 104 determines a distance D_A1 from the smart portable device 100 to a target object A1 according to an image of the target object A1.

Step 504: The direction determination unit 110 acquires a direction DIR_A1 from the smart portable device 100 to the target object A1.

Step 506: The positioning unit 108 acquires coordinate information Pos_SM of a current position of the smart portable device 100.

Step 508: The TOP determination unit 112 determines coordinate information Pos_A1 of a position of the target object A1 according to the distance D_A1, the direction DIR_A1 and the coordinate information Pos_SM.

Step 510: End.

Figure 5B:
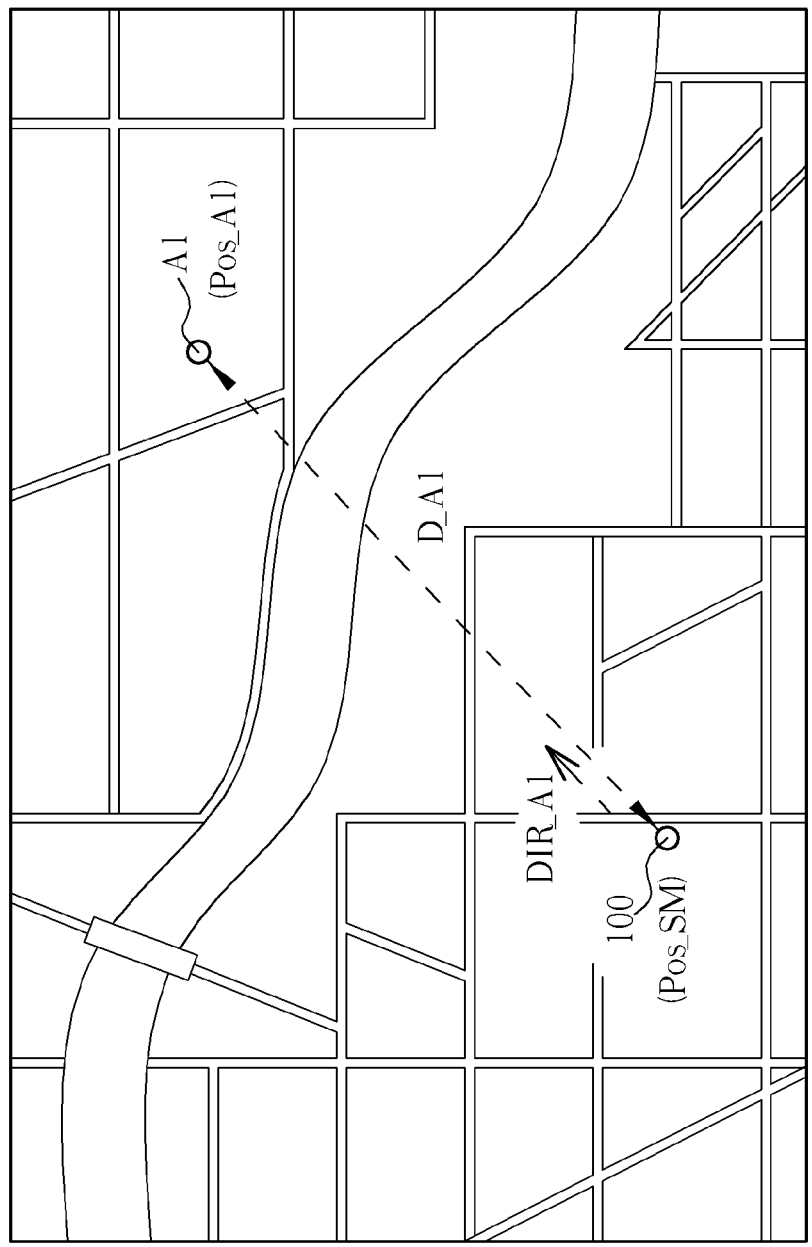
FIG. 5B is a bird's eye view diagram when the target object position determination process of FIG. 5A is performed.

Operations of the TOP determination process 50 can be represented by a bird's eye view diagram, as illustrated in FIG. 5B. First, to get the coordinate information Pos_A1 of the target object A1, the user can determine the distance D_A1 from the smart portable device 100 to the target object A1 by the distance detection device 104 according to the image of the target object A1. Next, the user determines the direction DIR_A1 from the smart portable device 100 to the target object A1 by the direction determination unit 110. After the distance D_A1 and the direction DIR_A1 are acquired, the TOP determination unit 112 can determine the coordinate information of the target object A1 as long as the coordinate information Pos_SM of the smart portable device 100 is acquired by the positioning unit 108.

Via the TOP determination process 50, the user can find out a position of an unknown spot. For example, if the user sees and desires to visit an unknown spot during a trip, coordinate information of the spot can be acquired according to the TOP determination process 50, such that the user can configure the spot as a navigation destination, and make a route plan via the navigation software.

Therefore, via the TOP determination process 50, the user can get the position of the unknown spot and visit the spot according to the route plan of the navigation software, to enhance utilization convenience.

Second: determination of the current position. When the positioning unit 108 malfunctions because of poor connection quality, indoor application, bad weather, etc., the present invention can determine the coordinate information Pos_SM of the current position of the smart portable device 100. In such a situation, the present invention provides two embodiments.

Figure 6A:
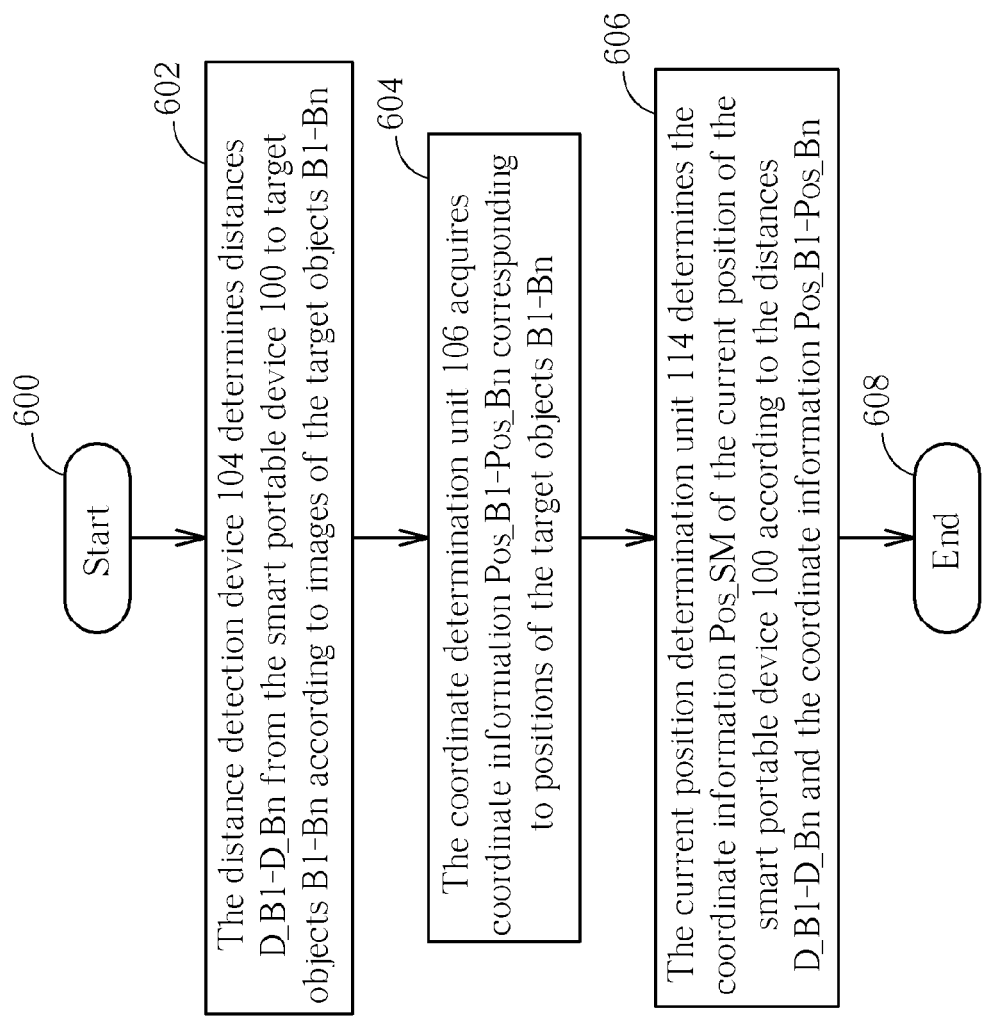
FIG. 6A is a schematic diagram of a current position determination process according to an embodiment of the present invention.

Please refer to FIG. 6A, which is a schematic diagram of a current position determination process 60 according to an embodiment of the present invention. The current position determination process 60 is utilized for determining the current position of the smart portable device 100, and includes the following steps:

Step 600: Start.

Step 602: The distance detection device 104 determines distances D_B1-D_Bn from the smart portable device 100 to target objects B1-Bn according to images of the target objects B1-Bn.

Step 604: The coordinate determination unit 106 acquires coordinate information Pos_B1-Pos_Bn corresponding to positions of the target objects B1-Bn.

Step 606: The current position determination unit 114 determines the coordinate information Pos_SM of the current position of the smart portable device 100 according to the distances D_B1-D_Bn and the coordinate information Pos_B1-Pos_Bn.

Step 608: End.

Figure 6B:
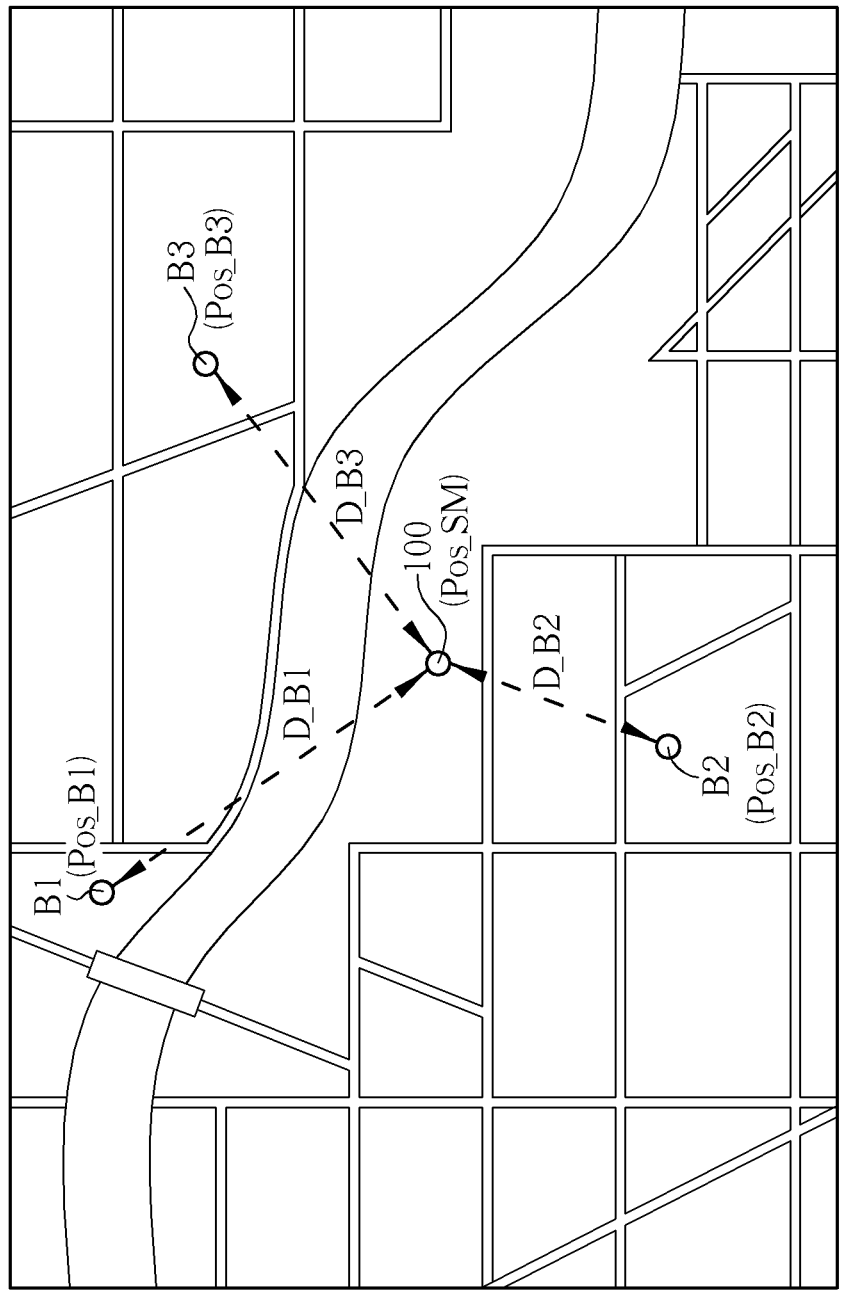
FIG. 6B is a bird's eye view diagram when the process of FIG. 6A is performed.

To clearly describe operations of the current position determination process 60, assume the number "n" of the target object B1-Bn is 3. Please refer to FIG. 6B, which is a bird's eye view diagram when the current position determination process 60 is performed. Firstly, in case that the positioning unit 108 and the direction determination unit 110 malfunction, while the user desires to get coordinate information Pos_SM of the current position of the smart portable device 100, the user has to acquire images of the target object B1-B3, to determine the distances D_B1-D_B3 from the smart portable device 100 to target objects B1-B3 by the distance detection device 104. Next, the present invention can access the geographic information system via the coordinate determination unit 106, to acquire the coordinate information Pos_B1-Pos_B3 of the target objects B1-B3. Finally, the current position determination unit 114 can determine the coordinate information Pos_SM of the current position of the smart portable device 100 based upon the triangle positioning method.

Therefore, even if the positioning unit 108 and the direction determination unit 110 malfunction, according to the current position determination process 60, the present invention can inversely derive the position of the smart portable device 100 from images and distances of nearby spots to provide references for the user. In such a situation, the user can accordingly determine the current position, to get a route plan by the navigation software, so as to solve problems induced by malfunction of the positioning unit 108 and the direction determination unit 110.

Figure 7A:
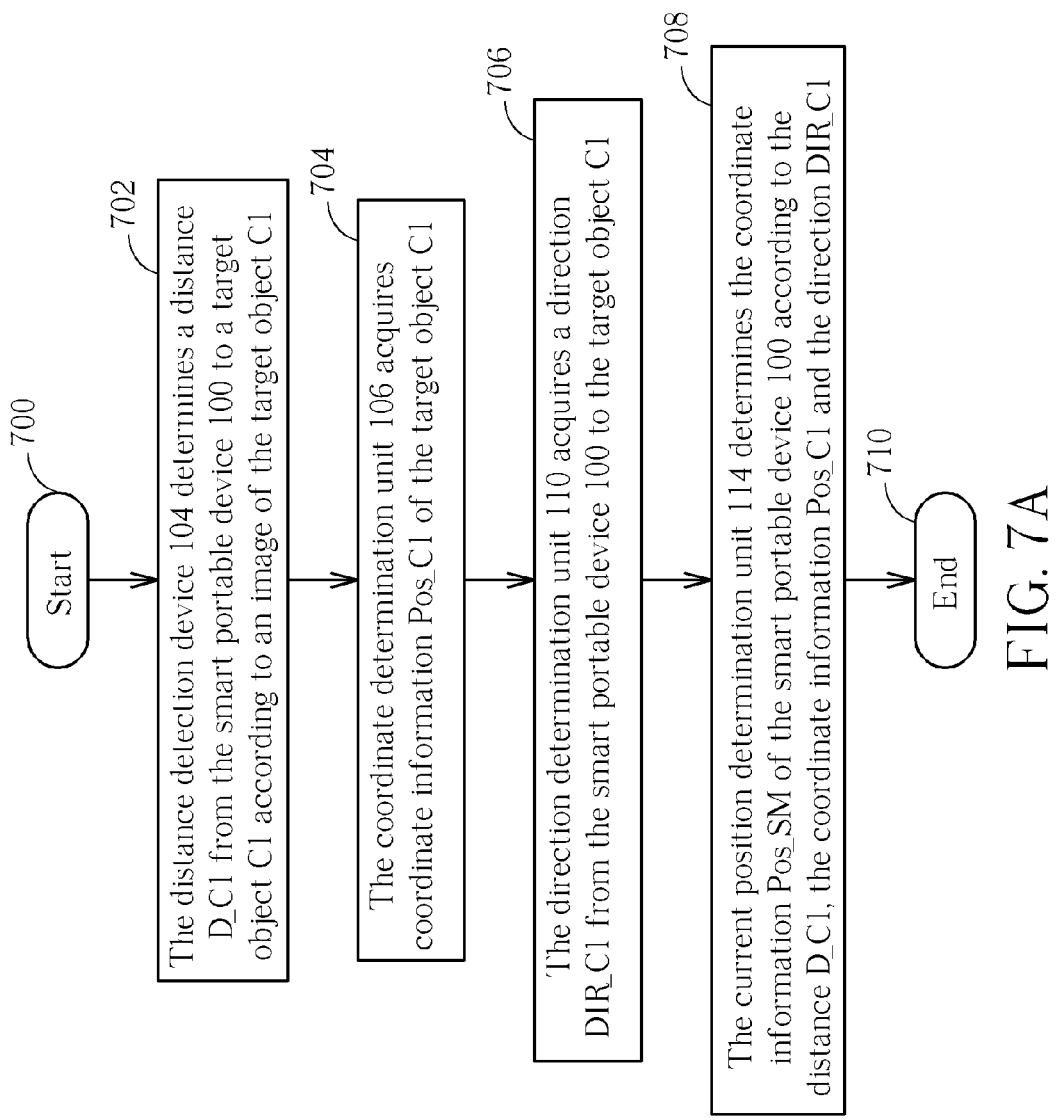
FIG. 7A is a schematic diagram of a current position determination process according to an embodiment of the present invention.

Moreover, please refer to FIG. 7A, which is a schematic diagram of a current position determination process 70 according to an embodiment of the present invention. The current position determination process 70 is utilized for recognizing the current position in the smart portable device 100, and includes the following steps:

Step 700: Start.

Step 702: The distance detection device 104 determines a distance D_C1 from the smart portable device 100 to a target object C1 according to an image of the target object C1.

Step 704: The coordinate determination unit 106 acquires coordinate information Pos_C1 of the target object C1.

Step 706: The direction determination unit 110 acquires a direction DIR_C1 from the smart portable device 100 to the target object C1.

Step 708: The current position determination unit 114 determines the coordinate information Pos_SM of the smart portable device 100 according to the distance D_C1, the coordinate information Pos_C1 and the direction DIR_C1.

Step 710: End.

Figure 7B:
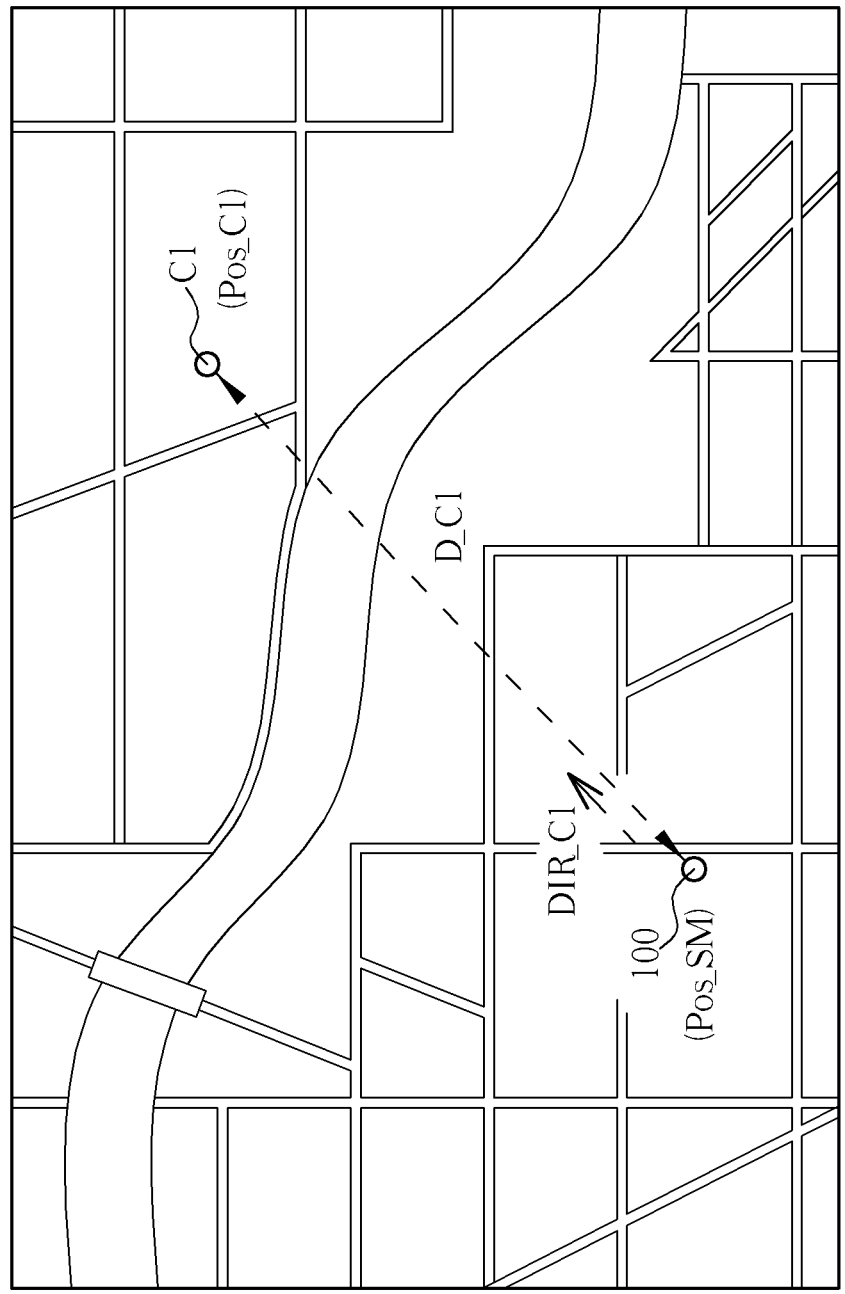
FIG. 7B is a bird's eye view diagram when the process of FIG. 7A is performed.

The current position determination process 70 differs from the current position determination process 60 in utilizing a determination result of the direction determination unit 110. Thus, the current position determination process 70 can work with the only one target object C1. For example, please refer to FIG. 7B, which is a bird's eye view diagram when the current position determination process 70 is performed. Firstly, when the positioning unit 108 malfunctions, and the user desires to get the coordinate information Pos_SM of the current position of the smart portable device 100, the user has to acquire the image of the target object C1, to determine the distance D_C1 between the smart potable device 100 and the target object C1 by the distance detection device 104. Next, the present invention can access the geographic information system via the coordinate determination unit 106, to acquire the coordinate information Pos_C1 of the target object C1, and meanwhile, acquire the direction DIR_C1 from the smart portable device 100 to the target object C1 by the direction determination unit 110. Finally, the current position determination unit 114 can determine the coordinate information Pos_SM of the current position of the smart portable device 100 based upon the distance D_C1, the coordinate information Pos_C1 and the direction DIR_C1.

Therefore, according to the current position determination process 70, in case that the positioning unit 108 malfunctions, but the navigation software installed in the smart portable device 100 functions well, the present invention can inversely derive the position of the smart portable device 100 from images, distances and directions of nearby spots to provide references for the user. In such a situation, the user can accordingly determine the position, to get a route plan by the navigation software, so as to solve problems induced by malfunction or absence of the positioning unit 108.

To sum up, the present invention utilizes an image of a target object to determine a distance between the target object and the smart portable device. After the distance between the target object and the smart portable device is determined, the present invention can further utilize a GPS receiver and an e-compass, to determine the position of the target object for navigation usage. Alternatively, when the GPS receiver malfunctions, the present invention can utilize the geographic information system and the e-compass, to determine the current position of the smart portable device, so as to verify the position of the user by the navigation software. Furthermore, the present invention can utilize images of multiple target objects to determine the current position of the smart portable device by the geographic information system. Therefore, as described in the above, the present invention can enhance performance of the smart portable device, especially for the navigation function.

Those skilled in the art will readily observe that numerous modifications and alterations of the device and method may be made while retaining the teachings of the invention.

What is claimed is:

1. A method for detecting distance in a smart portable device comprising:
   receiving a first digital image comprising the target object by a photo sensor of an image acquisition unit of the smart portable device;
   displaying and enlarging the first display image by a display unit of the image acquisition unit;
   selecting a digital image of the target object in the first digital image by a selection unit of the image acquisition unit;
   automatically calculating a length of a side of the target object in the digital image displayed on a display unit by a processing means of the smart portable device;
   acquiring a predicted length of the side of the target object from user prediction by the processing means;
   automatically determining a mil value of the length of the side in the digital image from the length of the side in the digital image by the processing means without user assistance; and
   calculating the distance between the smart portable device and the target object according to a ratio of the predicted length to the mil value by the processing means.

2. The method of claim 1 further comprising:
   determining an angle when acquiring the digital image of the target object; and
   correcting the distance between the smart portable device and the target object according to the angle.

3. A device for detecting distance in a smart portable device comprising:
   an image acquisition unit, for acquiring a digital image of a target object by a photo sensor, the image acquisition unit comprising:
      an image reception unit, for receiving a first digital image comprising the target object;

a display unit, for displaying and enlarging the first digital image; and a selection unit, for selecting the digital image of the target object in the first digital image according to a user command;

a processing device, for receiving instructions to execute the following steps:

automatically calculating a length of a side of the target object in the digital image displayed on the display unit;

acquiring a predicted length of the side of the target object from user prediction;

automatically determining a mil value of the length of the side in the digital image from the length of the side in the digital image without user assistance; and calculating the distance between the smart portable device and the target object according to a ratio of the predicted length to the mil value.

4. The device of claim 3, wherein the processing device further receives instructions to execute:

determining an angle when the image acquisition unit acquires the digital image of the target object; and correcting the distance between the smart portable device and the target object according to the angle.

* * * * *